United States Patent
Schmid et al.

(10) Patent No.: US 6,343,570 B1
(45) Date of Patent: Feb. 5, 2002

(54) STEAM GENERATOR, IN PARTICULAR WASTE-HEAT STEAM GENERATOR, AND METHOD FOR OPERATING THE STEAM GENERATOR

(75) Inventors: Erich Schmid, Marloffstein; Helmut Stierstorfer; Carl Lockwood, both of Erlangen; Uwe Lenk, Zwickau, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/513,615

(22) Filed: Feb. 25, 2000

Related U.S. Application Data

(63) Continuation of application No. PCT/DE98/02330, filed on Aug. 12, 1998.

(30) Foreign Application Priority Data

Aug. 25, 1997 (DE) .......................................... 197 36 885

(51) Int. Cl.$^7$ ................................................. F22G 3/00
(52) U.S. Cl. ........................ 122/7 R; 122/460; 122/468
(58) Field of Search ................................ 122/1 C, 7 R, 122/7 C, 412, 415, 460, 466, 468

(56) References Cited

U.S. PATENT DOCUMENTS

| | | | |
|---|---|---|---|
| 3,769,795 A | * 11/1973 | Rostrom | 122/7 R |
| 4,262,636 A | * 4/1981 | Augsburger | 122/7 R |
| 5,293,842 A | * 3/1994 | Loesel | 122/7 R |
| 5,369,950 A | * 12/1994 | Bruckner et al. | 122/7 R |
| 5,660,799 A | * 8/1997 | Motai et al. | 122/7 R |
| 5,765,509 A | * 6/1998 | Liebig et al. | 122/7 R |
| 6,101,982 A | * 8/2000 | Fischer et al. | 122/7 R |

FOREIGN PATENT DOCUMENTS

EP 0777036 A1 6/1997

OTHER PUBLICATIONS

Japanese Patent Abstract No. 02223701 (Yasuhiro), dated Sep. 6, 1990.

"Once–Through Heat Recovery Steam Generators Working with Sub—and Supercritical Steam Conditions for Combined Cycles", P J Dechamps et al., International Gas Turbine & Aeroengine Congress and Exhibition, Orlando, Florida Jun. 2, to Jun. 5, 1997, pp. 1–10.

\* cited by examiner

*Primary Examiner*—Gregory Wilson
(74) *Attorney, Agent, or Firm*—Herbert L. Lerner; Laurence A. Greenberg; Werner H. Stemer

(57) ABSTRACT

A steam generator, in particular a waste-heat steam generator, includes first and second evaporator heating surfaces located in an elongate gas flue for hot gas. A first supply line for feed water is throughflow-connected on an inlet side to the first evaporator heating surface, while the second evaporator heating surface is throughflow-connected on an inlet and an outlet side to a low-pressure drum. The low-pressure drum is provided with a second supply line for feed water. The first supply line has a first treatment point and the second supply line a second treatment point. Each of the treatment points serves for adding and/or extracting chemicals for water treatment, so that each evaporator heating surface can receive only feed water which is conditioned according to regulations applying to that evaporator heating surface. A method for operating the steam generator is also provided.

11 Claims, 3 Drawing Sheets

STEAM GENERATOR, IN PARTICULAR WASTE-HEAT STEAM GENERATOR, AND METHOD FOR OPERATING THE STEAM GENERATOR

CROSS-REFERENCE TO RELATED APPLICATION

This application is a continuation of copending International Application No. PCT/DE98/02330, filed Aug. 12, 1998, which designated the United States.

BACKGROUND OF THE INVENTION

Field of the Invention

The invention relates to a steam generator, in particular a waste-heat steam generator, including an elongate gas flue having an inflow end for hot gas and an outflow end for cooled hot gas, a first evaporator heating surface, a first feed water supply line throughflow-connected to the first evaporator heating surface on an inlet side, a second evaporator heating surface disposed in the gas flue downstream of the first evaporator heating surface, as seen in a throughflow direction of the hot gas, the second evaporator heating surface throughflow-connected both on an inlet and on an outlet side to a low-pressure drum, and a second feed water supply line connected to the low-pressure drum. The first supply line has a first treatment point for adding and/or extracting chemicals for water treatment and the second supply line has a second treatment point for adding and/or extracting chemicals for water treatment. The invention also relates to a method for operating the steam generator.

Such a steam generator is known from ASME Paper 97-GT337 entitled "Once-through Heat Recovery Steam Generators working with Sub- and Supercritical Steam Conditions for Combined Cycles", by P. J. Dechamps and J-F. Galopin, International Gas Turbine & Aeroengine Congress and Exhibition, Orlando, Fla. Jun. 2 to Jun. 5, 1997, in particular page 7, left-hand column, second paragraph, and from European Patent Application 0 777 036, corresponding to U.S. Pat. No. 5,776,413.

When the hot gas has high temperatures, the higher pressure stage of that steam generator, that is the pressure stage which is operable in the once-through mode and includes the first evaporator heating surface, also makes it possible to implement high operating pressures up to supercritical states. That allows improved efficiency. Furthermore, the higher pressure stage requires, at most, only a relatively thin-walled water separation bottle at the steam outflow of the first evaporator heating surface, so that faster start-up times of the steam generator and faster reactions of that steam generator to load changes are possible. The second evaporator heating surface, together with the low-pressure drum associated therewith, is operated in the circulating mode and utilizes the low temperature which the hot gas still has after passing through the first evaporator heating surface. That too leads to an improvement in efficiency. Due to the low pressure in the low-pressure drum, the latter can likewise be relatively thin-walled. It is therefore no obstacle either to fast start-up times or to the fast reaction of the steam generator to load changes. In addition, the circulating flow in the second evaporator heating surface has no instabilities and does not lead to any erosions in the second evaporator heating surface.

However, the first evaporator heating surface operated in the once-through mode requires different conditioning of the feed water from that of an evaporator heating surface operated in the circulating mode, that is to say from that of the second evaporator heating surface connected to the low-pressure drum both on the inlet and on the outlet side.

SUMMARY OF THE INVENTION

It is accordingly an object of the invention to provide a steam generator, in particular a waste-heat steam generator, and a method for operating the steam generator, which overcome the hereinafore-mentioned disadvantages of the heretofore-known devices and methods of this general type and which ensure that both a first evaporator heating surface operated in a once-through mode and a second evaporator heating surface operated in a circulating mode receive only feed water that is conditioned for them.

With the foregoing and other objects in view there is provided, in accordance with the invention, a steam generator, in particular a waste-heat steam generator, comprising an elongate gas flue having an inflow end for hot gas and an outflow end for cooled hot gas, defining a throughflow direction of the hot gas; a first evaporator heating surface disposed in the gas flue and having an inlet side; a first feed water supply line throughflow-connected to the first evaporator heating surface on the inlet side, the first supply line having a first treatment point for adding and/or extracting chemicals for water treatment, and the first supply line having a preheater heating surface disposed within the gas flue and defining a connection point between the preheater heating surface and the first evaporator heating surface; a second evaporator heating surface disposed in the gas flue downstream of the first evaporator heating surface as seen in the throughflow direction of the hot gas, the second evaporator heating surface having inlet and outlet sides; a low-pressure drum throughflow-connected to the second evaporator heating surface on both the inlet and outlet sides; and a second feed water supply line connected to the low-pressure drum, the second feed water supply line having a second treatment point for adding and/or extracting chemicals for water treatment, and the second supply line throughflow-connected to the first supply line at the connection point.

The feed water for the first evaporator heating surface can be conditioned according to the requirements of this first evaporator heating surface through the use of chemicals which are added to and/or removed from the first treatment point of the first supply line. The feed water for the second evaporator heating surface can be conditioned according to the requirements of the latter by adding and/or removing chemicals at the second treatment point of the second supply line. Both supply lines can therefore be connected to the same common feed-water supply configuration. This feedwater supply configuration can deliver initial feed water of uniform initial quality and may, for example, be a hot well, a feed water treatment plant or a condensate collecting vessel.

In accordance with another feature of the invention, the first treatment point for adding and/or extracting chemicals for water treatment is disposed upstream of the preheater heating surface in terms of throughflow in the first supply line, and the second treatment point for adding and/or extracting chemicals for water treatment is disposed downstream of the connection point to the first supply line in terms of throughflow in the second supply line. Therefore, feed water conditioned in the first supply line may be reconditioned for the second evaporator heating surface.

In accordance with a further feature of the invention, the first supply line has a third treatment point for feed-water treatment, in particular for adding chemicals, downstream of the connection point of the second supply line and upstream of the evaporator heating surface in terms of through low. Therefore, the feed water in the first supply line may be preconditioned for both evaporator heating surfaces through the use of chemicals which are added to the first supply line at the first treatment point. Through the use of chemicals added to the second supply line at the second treatment point, feed water preconditioned for both evaporator heating surfaces from the first supply line may be reconditioned for the second evaporator heating surface. Finally, feed water in the first supply line, which is already preconditioned for both evaporator heating surfaces, may be reconditioned for the first evaporator heating surface at the third treatment point by the addition and/or extraction of further chemicals.

In accordance with an added feature of the invention, the preheater heating surface connected in the first supply line and disposed within the gas flue is a first preheater heating surface; the second supply line has a second preheater heating surface disposed within the gas flue and throughflow-connected to the first supply line at a given connection point upstream of the first preheater heating surface; the first treatment point for at least one of adding and extracting chemicals for water treatment is connected in the first supply line upstream of the first preheater heating surface and downstream of the given connection point in terms of throughflow; and the second treatment point for at least one of adding and extracting chemicals for water treatment is connected in the second supply line upstream of the second preheater heating surface in terms of throughflow. In this way, the feed water for the first evaporator heating surface may be accurately conditioned by the addition and/or extraction of chemicals at the first treatment point and the feed water for the second evaporator heating surface may be accurately conditioned by the addition and/or extraction of chemicals at the second treatment point.

In accordance with an additional feature of the invention, the second treatment point has a deaeration vessel for extracting a gaseous chemical from feed water. The deaeration vessel may advantageously be integrated in the low-pressure drum which is provided with the second supply line for feed water.

With the objects of the invention in view there is also provided a method for operating a steam generator, which comprises adding $NH_3$ and $O_2$ at the first treatment point, and adding $NH_3$ and extracting $O_2$ at the second treatment point.

With the objects of the invention in view, there is additionally provided a method for operating a steam generator, which comprises adding $NH_3$ at the first and second treatment points, and adding $O_2$ at the third treatment point.

With the objects of the invention in view, there is also provided a method for operating a steam generator, which comprises adding $NH_3$ and $O_2$ at the first treatment point, and adding $NH_3$ at the second treatment point.

Other features which are considered as characteristic for the invention are set forth in the appended claims.

Although the invention is illustrated and described herein as embodied in a steam generator, in particular a waste-heat steam generator, and a method for operating the steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
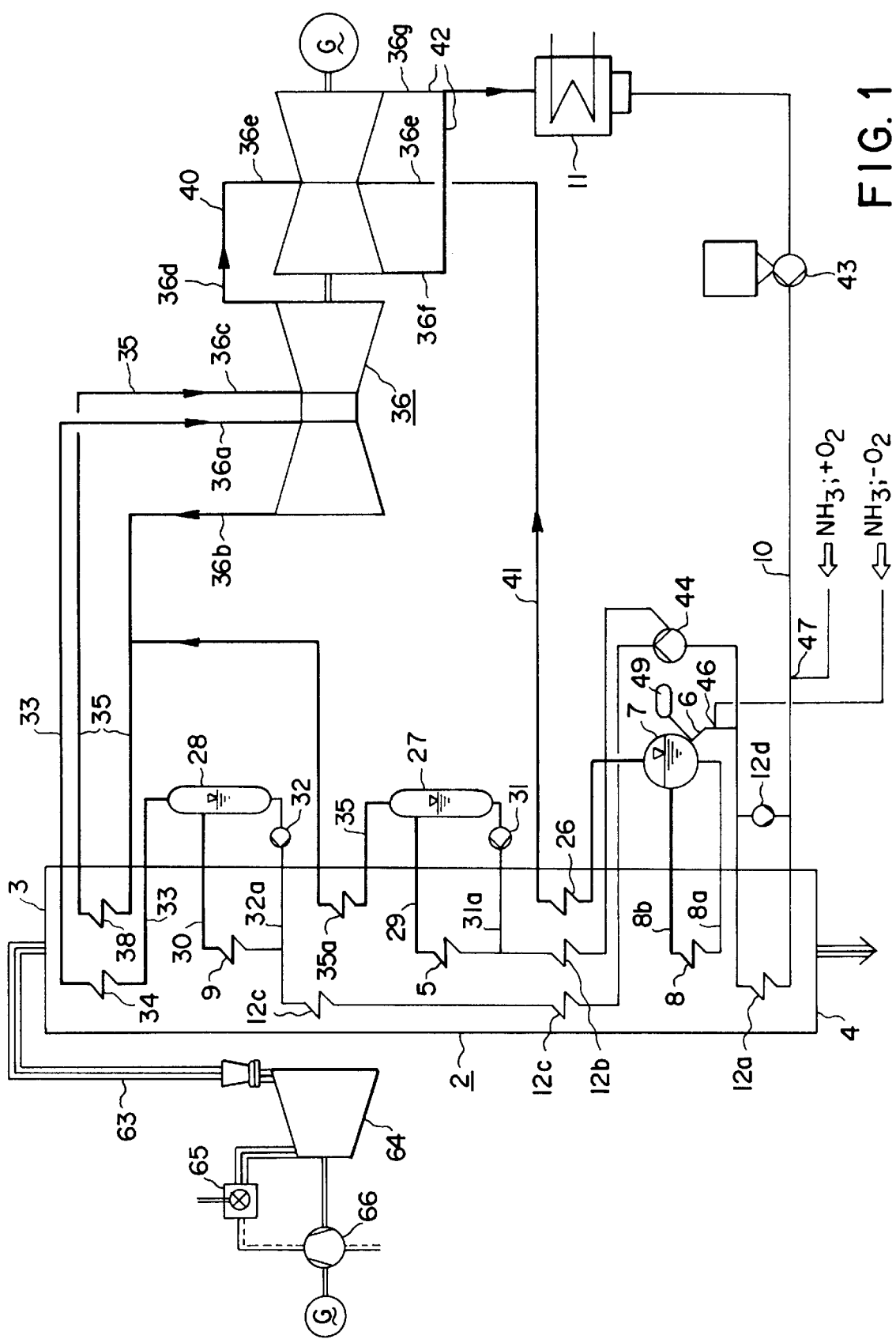
FIGS. 1 to 3 are schematic circuit diagrams of a combined-cycle plant of an electrical power station, in which identical parts are given the same reference symbols.

Referring now to the figures of the drawings in detail and first, particularly, to FIG. 1 thereof, there is seen a plant which has a waste-heat steam generator with an elongate gas flue 2. The gas flue 2 has an inflow end 3 and an outflow end 4. Three evaporator heating surfaces 9, 5 and 8 can be seen within the gas flue 2. The evaporator heating surfaces 9, 5 and 8 are disposed one behind the other in the gas flue 2, as seen in a throughflow direction for hot gas from the inflow end 3 to the outflow end 4. The evaporator heating surface 8 is nearest to the outflow end 4 of the gas flue and the evaporator heating surface 9 is nearest to the inflow end 3. The evaporator heating surface 5 is located between the two evaporator heating surfaces 8 and 9.

The evaporator heating surface 8 is connected both at an inlet 8a and at an outlet 8b thereof to a low-pressure drum 7. A supply line 6 for feed water (which will be referred to below as a second supply line) leads to the low-pressure drum 7. Furthermore, a low-pressure steam line 41 discharges from the low-pressure drum 7. The line 41 contains a superheater heating surface 26 which is disposed between the two evaporator heating surfaces 5 and 8 in the gas flue 2.

Each of the two evaporator heating surfaces 5 and 9 is associated with a respective start-up bottle 27, 28, into which a respective steam line 29, 30 discharging from the respective evaporator heating surface 5, 9 opens laterally.

A respective return line 31a, 32a guided to a respective inlet of the respective evaporator heating surface 5, 9 and containing a respective water pump 31, 32, discharges from the bottom of each of the two start-up bottles 27 and 28. Condensate water which is separated in the respective start-up bottle 27, 28 can be pumped back to the inlet of the respective evaporator heating surface 5, 9 through the use of this return line.

A high-pressure steam line 33, which discharges from the start-up bottle 28 associated with the evaporator heating surface 9, contains a superheater heating surface 34 which is located in the gas flue 2 of the waste-heat steam generator between the evaporator heating surface 9 and the inflow end 3 of the gas flue 2. On one hand, a further steam line 35 discharges from the start-up bottle 27 which is associated with the evaporator heating surface 5. The line 35 contains a superheater heating surface 35a which is disposed in the gas flue 2 between the two evaporator heating surfaces 5 and 9. On the other hand, this steam line 35 also discharges from a steam outflow 36b of a high-pressure part of a steam turbine 36. The high-pressure steam line 33 discharging from the start-up bottle 28 is guided to a steam inflow 36a of that high-pressure part. The steam line 35 contains a superheater heating surface 38 which, in terms of throughflow, follows both the superheater heating surface 35a and the steam outflow 36b. The superheater heating surface 38 is located within the gas flue 2, likewise between the inflow end 3 of the gas flue 2 and the evaporator heating surface 9. The steam line 35 discharges from the superheater heating surface 38 and is guided to a steam inflow 36c of a medium-pressure part of the steam turbine 36. A steam outflow 36d of this medium-pressure part of the steam turbine 36 is flow-connected, through a steam line 40, to a steam inflow 36e of two low-pressure parts of the steam turbine 36. The low-pressure steam line 41 discharging from the low-pressure drum 7 and containing the superheater heating surface 26, also leads to this steam inflow 36e. As mentioned above, this superheater heating surface 26 is disposed in the gas flue 2 between the two evaporator heating surfaces 5 and 8. An exhaust-steam line 42 discharges from two steam outflows 36f and 36g of the low-pressure part of the steam turbine 36 and is guided to a condenser 11.

A first supply line 10 for feed water contains a condensate pump 43 with an associated condensate purification system, as well as a preheater heating surface 12a located in the gas flue 2 and a high-pressure/medium-pressure feed-water pump 44 connected downstream of this preheater heating surface 12a. A connection point is located between the preheater heating surface 12a and the first evaporator heating surface 5, 9. The second supply line 6 is throughflow-connected to the first supply line 10 at the connection point. The supply line 10 discharges from this condenser 11 to inlet sides of the evaporator heating surfaces 5 and 9 located in the gas flue 2. The preheater heating surface 12a is disposed in the gas flue 2 between the outflow end 4 of the gas flue 2 and the evaporator heating surface 8. The inlet sides of the evaporator heating surfaces 5 and 9 are preceded in terms of through low in each case by a preheater heating surface 12b, 12c for feed water in the supply line 10 for feed water. These preheater heating surfaces 12b and 12c are disposed in the gas flue 2 between the evaporator heating surface 8 and the evaporator heating surface 5, 9. A circulating pump 12d which is connected in parallel with the preheater heating surface 12a can pump the feed water from an outlet of this preheater heating surface 12a back to its inlet in order to raise the temperature of the feed water entering the preheater heating surface 12a.

The supply line 6 for feed water leads to the low-pressure drum 7 and is throughflow-connected to the supply line 10 for feed water downstream of the preheating surface 12a and downstream of the circulating pump 12d, but upstream of the high-pressure/medium-pressure feed-water pump 44. A treatment point 46, which will be referred to below as a second treatment point, and which, for example, is a connection piece, is located on this supply line 6, downstream of the point of connection of this supply line 6 to the supply line 10 for feed water, in terms of throughflow.

Another treatment point 47, which will be referred to below as a first treatment point, and which, for example, is likewise a connection piece, is located outside the gas flue 2 on the supply line 10 between the condensate pump 43 and the preheater heating surface 12a and upstream of the circulating pump 12d.

A line 63 for hot gas, which emerges from a gas turbine 64, leads to the inflow end 3 of the gas flue 2. An inflow of this gas turbine 64 is associated with a combustion chamber 65 having a preceding compressor 66 driven by the gas turbine 64.

The gas turbine 64 and the steam turbine 36 each drive a respective electrical generator G.

The feed water can be conditioned according to regulations which apply to the evaporator heating surfaces 5 and 9 by the addition of $NH_3$ and $O_2$ at the treatment point 47. The feed water supplied to the low-pressure drum 7 is reconditioned in such a way that it conforms to regulations for the evaporator heating surface 8 by deaerating the feed water, that is to say by removing $O_2$ and by a further addition of $NH_3$ at the treatment point 46.

The exhaust steam leaving the steam turbine 36 through the exhaust-steam line 42 is precipitated in the condenser 11 as deaerated condensate which is purified in the condensate purification system 43.

A pH value of about 8.5 and an $O_2$ content of about 50 to 100 ppb are set for the feed water at the treatment point 47. The $O_2$ content of the feed water supplied to the low-pressure drum 7 is reduced to approximately 20 ppb in a heated deaeration vessel 49 which belongs to the low-pressure drum 7 and is associated with the treatment point 46. Moreover, $NH_3$ is also administered to the feed water to be supplied to the low-pressure drum 7 at the treatment point 46, so that the pH value of the feed water is finally raised to 9 to 9.5.

Figure 2:
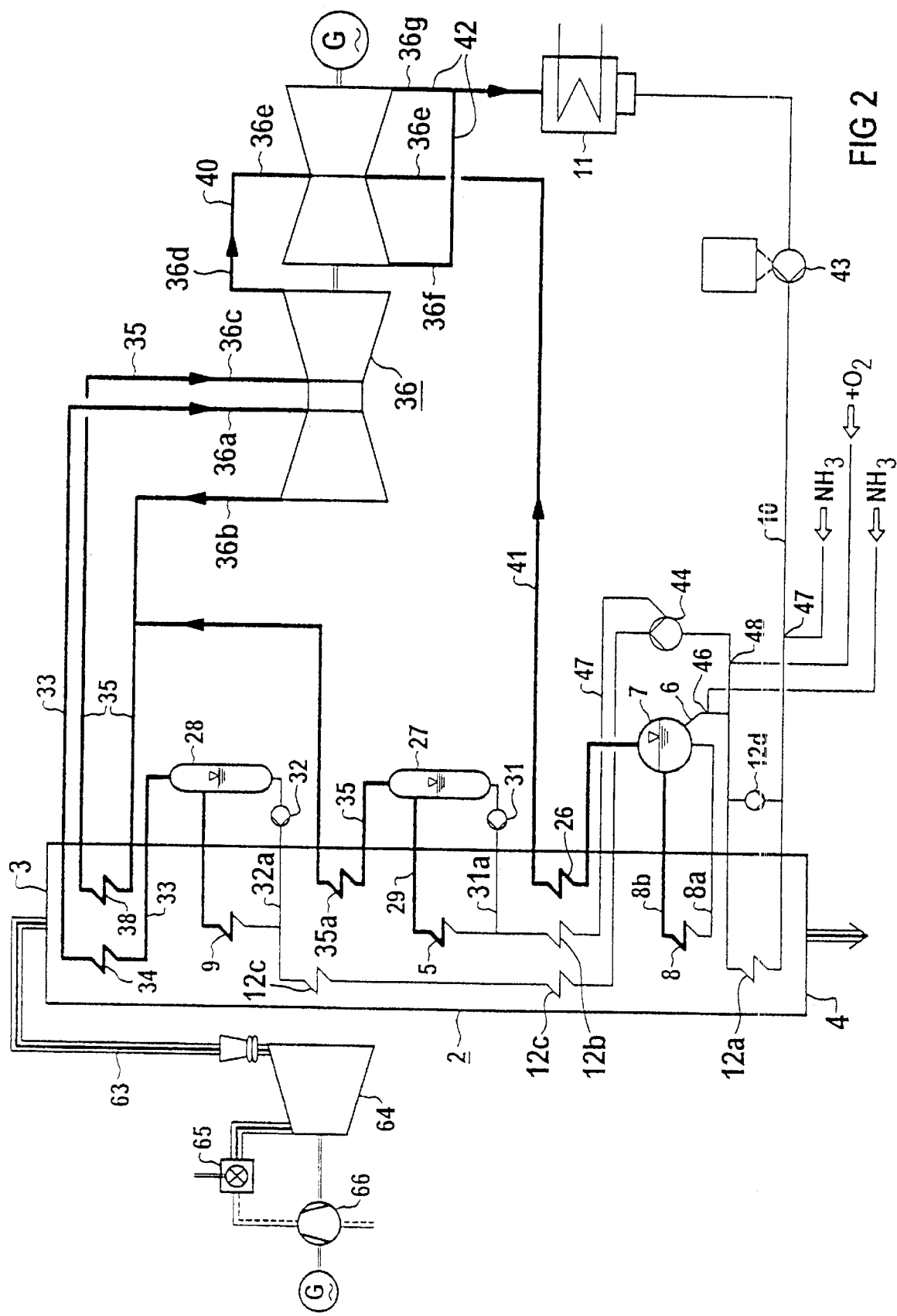

The combined-cycle plant according to FIG. 2 differs from the plant according to FIG. 1 only in that, in addition to the two treatment points 46 and 47 for adding and/or removing chemicals for water treatment, a third such treatment point 48 is also present. The third treatment point is, for example, likewise a connection piece and is located in the first supply line 10 for feed water downstream of the connection point of the second supply line 6 and upstream of the high-pressure/medium-pressure feed-water pump 44 and therefore upstream of the evaporator heating surfaces 5 and 9, in terms of flow.

The feed water can be preconditioned by adding $NH_3$ to the feed water at the treatment point 47 in FIG. 2. The feed water is reconditioned by the further addition of $NH_3$ at the treatment point 46, so that it conforms to the regulations for the evaporator heating surface 8. The feed water is reconditioned by the addition of $O_2$ at the treatment point 48, in such a way that it conforms to the regulations for the evaporator heating surfaces 5 and 9. It is not necessary to remove chemicals at any of the points 46 to 48, nor is any deaeration required.

Figure 3:
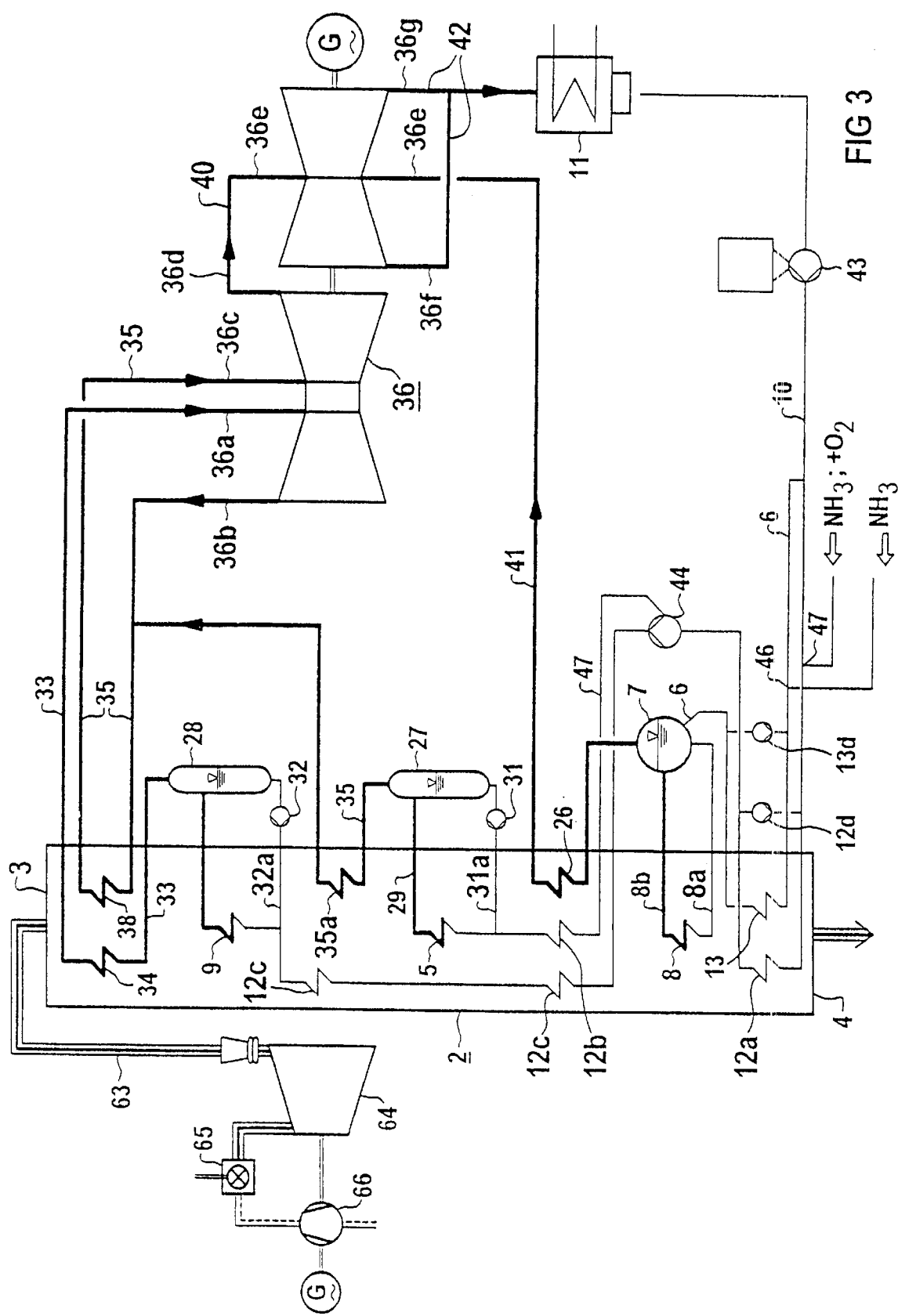

The combined-cycle plant according to FIG. 3 differs from the plant according to FIG. 1 only in that the second supply line 6 contains a second preheater heating surface 13 disposed within the gas flue 2. The second preheater heating surface 13 is throughflow-connected, at a given connection point upstream of the first preheater heating surface 12a, to the first supply line 10 between the first treatment point 47 and the condensate pump 43. The second treatment point 46 is provided on the second supply line 6 upstream of the second preheater heating surface 13, in terms of throughflow. The feed water coming from the condensate pump 43 can be conditioned accurately according to the regulations for the evaporator heating surfaces 5 and 9 by adding $NH_3$ and $O_2$ at the first treatment point 47 and accurately according to the regulations for the evaporator heating surface 8 by adding $NH_3$ at the treatment point 46.

A circulating pump 13d is also connected in parallel with the preheater heating surface 13, but downstream of the point of connection of the second supply line 6 to the first supply line 10 in terms of throughflow. The circulating pump 13d can pump feed water from the outlet of the preheater heating surface 13 back to the inlet of the latter, so that the temperature of the feed water entering this preheater heating surface is raised.

In the plants according to FIGS. 1 to 3, the condenser 11, together with the condensate pump 43, provide a common feed-water supply configuration, from which the initial feed water of uniform initial quality originates and finally flows, after being differently conditioned, to the first evaporator heating surfaces 5 and 9, on one hand, and to the second evaporator heating surface 8, on the other hand.

We claim:

1. A steam generator, comprising:

an elongate gas flue having an inflow end for hot gas and an outflow end for cooled hot gas, defining a throughflow direction of the hot gas;

a first evaporator heating surface disposed in said gas flue and having an inlet side;

a first feed water supply line throughflow-connected to said first evaporator heating surface on said inlet side, said first supply line having a first treatment point for at least one of adding and extracting chemicals for water treatment, and said first supply line having a preheater heating surface disposed within said gas flue and defining a connection point between said preheater heating surface and said first evaporator heating surface;

a second evaporator heating surface disposed in said gas flue downstream of said first evaporator heating surface as seen in said throughflow direction of the hot gas, said second evaporator heating surface having inlet and outlet sides;

a low-pressure drum throughflow-connected to said second evaporator heating surface on both said inlet and outlet sides; and a second feed water supply line connected to said low-pressure drum, said second feed water supply line having a second treatment point for at least one of adding and extracting chemicals for water treatment, and said second treatment point has a deaeration vessel for extracting a gaseous chemical from feed water and said second supply line throughflow-connected to said first supply line at said connection point.

2. The steam generator according to claim 1, wherein said first treatment point for at least one of adding and extracting chemicals for water treatment is disposed upstream of said preheater heating surface in terms of throughflow in said first supply line, and said second treatment point for at least one of adding and extracting chemicals for water treatment is disposed downstream of said connection point to said first supply line in terms of throughflow in said second supply line.

3. The steam generator according to claim 2, wherein said first supply line has a third treatment point for feed-water treatment downstream of said connection point of said second supply line and upstream of said evaporator heating surface in terms of throughflow.

4. The steam generator according to claim 3, wherein said third treatment point is provided for adding chemicals.

5. A method for operating a steam generator according to claim 3, which comprises adding $NH_3$ at said first and second treatment points, and adding $O_2$ at said third treatment point.

6. A method for operating a steam generator according to claim 2, which comprises adding $NH_3$ and $O_2$ at said first treatment point, and adding $NH_3$ and extracting $O_2$ at said second treatment point.

7. The steam generator according to claim 1, wherein:

said preheater heating surface connected in said first supply line and disposed within said gas flue is a first preheater heating surface;

said second supply line has a second preheater heating surface disposed within said gas flue and throughflow-connected to said first supply line at a given connection point upstream of said first preheater heating surface;

said first treatment point for at least one of adding and extracting chemicals for water treatment is connected in said first supply line upstream of said first preheater heating surface and downstream of said given connection point in terms of throughflow; and said second treatment point for at least one of adding and extracting chemicals for water treatment is connected in said second supply line upstream of said second preheater heating surface in terms of throughflow.

8. A method for operating a steam generator according to claim 7, which comprises adding $NH_3$ and $O_2$ at said first treatment point, and adding $NH_3$ at said second treatment point.

9. A method for operating a steam generator, which comprises:

providing an elongate gas flue having an inflow end for hot gas and an outflow end for cooled hot gas;

defining a throughflow direction of the hot gas;

disposing a first evaporator heating surface in the gas flue, the first evaporator having an inlet side;

connecting a first feed water supply line throughflow- to the first evaporator heating surface on the inlet side, the first supply line having a first treatment point for at least one of adding and extracting chemicals for water treatment, and the first supply line having a preheater heating surface disposed within the gas flue and defining a connection point between the preheater heating surface and the first evaporator heating surface;

disposing a second evaporator heating surface in the gas flue downstream of the first evaporator heating surface as seen in the throughflow direction of the hot gas, the second evaporator heating surface having inlet and outlet sides;

throughflow connecting a low-pressure drum to the second evaporator heating surface on both the inlet and outlet sides; and connecting a second feed water supply line to the low-pressure drum, the second feed water supply line having a second treatment point for at least one of adding and extracting chemicals for water treatment;

throughflow connecting the second supply line to the first supply line at the connection point;

disposing the first treatment point for at least one of adding and extracting chemicals for water treatment is upstream of the preheater heating surface in terms of throughflow in the first supply line;

disposing the second treatment point for at least one of adding and extracting chemicals for water treatment downstream of the connection point to the first supply line in terms of throughflow in the second supply line;

adding $NH_3$ and $O_2$ at the first treatment point; and adding $NH_3$ and extracting $O_2$ at the second treatment point.

10. A method for operating a steam generator, which comprises:

providing an elongate gas flue having an inflow end for hot gas and an outflow end for cooled hot gas;

defining a throughflow direction of the hot gas;

disposing a first evaporator heating surface in the gas flue, the first evaporator having an inlet side;

connecting a first feed water supply line throughflow- to the first evaporator heating surface on the inlet side, the first supply line having a first treatment point for at least one of adding and extracting chemicals for water treatment, and the first supply line having a preheater heating surface disposed within the gas flue and defining a connection point between the preheater heating surface and the first evaporator heating surface;

disposing a second evaporator heating surface in the gas flue downstream of the first evaporator heating surface as seen in the throughflow direction of the hot gas, the second evaporator heating surface having inlet and outlet sides;

throughflow connecting a low-pressure drum to the second evaporator heating surface on both the inlet and outlet sides; and connecting a second feed water supply line to the low-pressure drum, the second feed water supply line having a second treatment point for at least one of adding and extracting chemicals for water treatment;

throughflow connecting the second supply line to the first supply line at the connection point;

disposing the first treatment point for at least one of adding and extracting chemicals for water treatment is upstream of the preheater heating surface in terms of throughflow in the first supply line;

disposing the second treatment point for at least one of adding and extracting chemicals for water treatment downstream of the connection point to the first supply line in terms of throughflow in the second supply line;

including a third treatment point in the first supply line for feed-water treatment downstream of the connection point of the second supply line and upstream of the evaporator heating surface in terms of throughflow;

adding $NH_3$ at the first and second treatment points; and adding $O_2$ at the third treatment point.

11. A method for operating a steam generator, which comprises:

providing an elongate gas flue having an inflow end for hot gas and an outflow end for cooled hot gas;

defining a throughflow direction of the hot gas;

disposing a first evaporator heating surface in the gas flue, the first evaporator having an inlet side;

connecting a first feed water supply line throughflow- to the first evaporator heating surface on the inlet side, the first supply line having a first treatment point for at least one of adding and extracting chemicals for water treatment, and the first supply line having a preheater heating surface disposed within the gas flue and defining a connection point between the preheater heating surface and the first evaporator heating surface;

disposing a second evaporator heating surface in the gas flue downstream of the first evaporator heating surface as seen in the throughflow direction of the hot gas, the second evaporator heating surface having inlet and outlet sides;

throughflow connecting a low-pressure drum to the second evaporator heating surface on both the inlet and outlet sides; and connecting a second feed water supply line to the low-pressure drum, the second feed water supply line having a second treatment point for at least one of adding and extracting chemicals for water treatment;

throughflow connecting the second supply line to the first supply line at the connection point;

the preheater heating surface connected in the first supply line and disposed within the gas flue is a first preheater heating surface;

disposing a second preheater heating surface of the second supply line within the gas flue, the second preheater heating surface throughflow-connecting to the first supply line at a given connection point upstream of the first preheater heating surface;

connecting the first treatment point for at least one of adding and extracting chemicals for water treatment in the first supply line upstream of the first preheater heating surface and downstream of the given connection point in terms of throughflow;

connecting the second treatment point for at least one of adding and extracting chemicals for water treatment in the second supply line upstream of the second preheater heating surface in terms of throughflow;

adding $NH_3$ and $O_2$ at the first treatment point; and adding $NH_3$ at the second treatment point.

* * * * *